Patented Feb. 13, 1945

2,369,157

UNITED STATES PATENT OFFICE 2,369,157

SYNTHESIS OF ETHERS OF VITAMIN A

Nicholas A. Milas, Belmont, Mass., assignor to Research Corporation, New York, N. Y., a corporation of New York No Drawing. Application September 2, 1941, Serial No. 409,314

8 Claims. (Cl. 260—611)

In my application Serial No. 317,967, filed February 8, 1940, I have disclosed the production of alkyl ethers of vitamins A and D by reacting metallic vitaminates of said vitamins with alkyl halides or sulfates. An object of the present invention is to provide a new method for the synthesis of the alkyl ethers of vitamin A which may be regarded as starting with the aldehyde compound having the formula

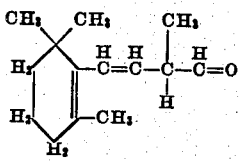

Compound I and a ketone compound having the formula

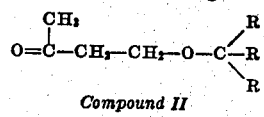

Compound II in which R stands for a member of the group consisting of hydrogen and hydrocarbon radicals. The group

may be any alkyl group such as methyl, ethyl, etc., including substituted alkyls such as triphenyl methyl in which the R's stand for phenyl radicals.

Widely separated examples of compounds corresponding to the above general formula have been selected for the purpose of testing the operability of the process. The examples selected are compounds in which the group

is ethyl and trityl, respectively.

The aldehyde compound I and the ketone compound II can be combined in several ways and the product converted by hydrogenation and dehydration into an alkyl ether of vitamin A or a part of the necessary hydrogenation and dehydration may be performed prior to the combination, as will appear more fully hereinafter.

For the preparation of the ethyl ether of vitamin A the process may start with the preparation of β-ethoxy propionic acid which is carried out as follows:

Dissolve 536 g. of β-ethoxy ethyl propionate in 2.5 liters of 95% ethanol containing 250 g. potassium hydroxide and reflux the mixture on the water bath for 3 hours. Remove most of the alcohol by vacuum distillation, cool the residue to 0° C. and neutralize with the calculated amount of 30% phosphoric acid. Extract the mixture with ether, dry and distill under reduced pressure. Collect the product at 112–114° C. (15 mm.). The yield amounts to 65–75% of the theoretical yield.

This reaction is shown by the equation:

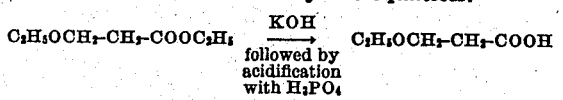

The β-ethoxy propionic acid prepared as described above is converted into β-ethoxy propionyl chloride as follows:

Place 41.9 g. of β-ethoxy propionic acid in a round bottom flask attached to a condenser by means of a ground glass joint and cool to between —5 to —10° C. Add slowly through the condenser 24 g. of phosphorus trichloride, then heat the mixture on the water bath for two hours. Cool to room temperature and separate the upper layer from the syrupy phosphorus acid by decantation. Fractionate the upper layer under reduced pressure and collect the product that distills at 43–45° (10 mm.). Yield 47.1 g. or 97% of the theory.

This reaction is shown by the equation:

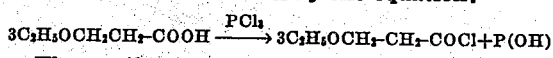

The β-ethoxy propionyl chloride is converted to the β-ethoxy ethyl methyl ketone as follows:

Prepare a Grignard solution from 55 g. (5% excess) of methyl iodide in 200 cc. anhydrous ethyl ether and 9.4 g. magnesium. After the Grignard is completely formed add to the mixture slowly 71 g. of anhydrous cadmium chloride. The resulting cadmium Grignard is then slowly added with stirring at 0° C. to 50 g. of β-ethoxy propionyl chloride dissolved in about 100 cc. of anhydrous ether. After all of the Grignard has been added allow the mixture to come to room temperature and after about six hours decompose the product by pouring it onto a mixture of ice and ammonium chloride or sulfate. Extract with ether a number of times and wash the ether extract with sodium bicarbonate solution to remove any traces of acid which might cause decomposition of the ketone. Distill ketone in vacuum and collect the fraction at 43–45° (16 mm.). This product forms a 2,4-dinitrophenylhydrazone which melts at 89–90° and which has the correct nitrogen and ethoxyl analysis.

This reaction is shown by the equation:

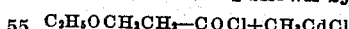
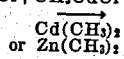
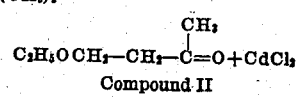

Compound II

When methyl chloride is substituted for methyl iodide in the foregoing example, a better yield is obtained.

A simple method of effecting the combination of compounds I and II is as follows. The β-ethoxy ethyl methyl ketone prepared as described above is converted to the β-ethoxy ethyl methyl ethynyl carbinol as follows:

Saturate about 1 liter of liquid ammonia with dry acetylene and add slowly in the course of 1 hr. 24 g. of metallic sodium while a stream of acetylene is being passed through the solution at such a rate that the blue color formed disappears rapidly. The temperature should be kept below —40° C. When the reaction is over, the mixture is well stirred and cooled to —60 to —70° C. and 116 g. of the β-ethoxy ketone is slowly added in the course of 2 hours. Finally, the mixture is allowed to stand overnight at the above temperature, then the ammonia is removed and the mixture hydrolyzed by the addition of ammonium sulfate or chloride. The mixture is then extracted a number of times with ether, the extracts dried over anhydrous magnesium sulfate, the ether removed and the residue fractionated.

An alternative method for the preparation of this compound consists in the use of potassium tertiary butylate.

The reaction of the foregoing example is shown by the equation:

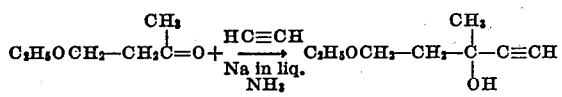

The β-ethoxy ethyl methyl ethynyl carbinol is converted to the Grignard thereof by adding a mole (+5% excess) of β-ethoxy ethyl methyl ethynyl carbinol to exactly two moles of ethyl magnesium bromide and allowing the mixture to stand for at least 2 hours, then refluxing for about 1 hour.

The resulting Grignard of the β-ethoxy ethyl methyl ethynyl carbinol is then reacted with the aldehyde (Compound I) as follows:

To the acetylene Grignard from the previous step, add 1 mole of the aldehyde, Compound I, in about 200 cc. of anhydrous ether, keeping the mixture at 0° C. during addition. Allow mixture to warm slowly to room temperature then reflux for 8 to 10 hours. Cool and pour onto ice mixed with sufficient amount of ammonium sulfate. Extract with ether, dry over anhydrous magnesium sulfate and remove the ether. Distill all low boiling fractions under high vacuum at not higher than 60–80° C. The residue product is chiefly the glycol.

The reaction is shown by the equation:

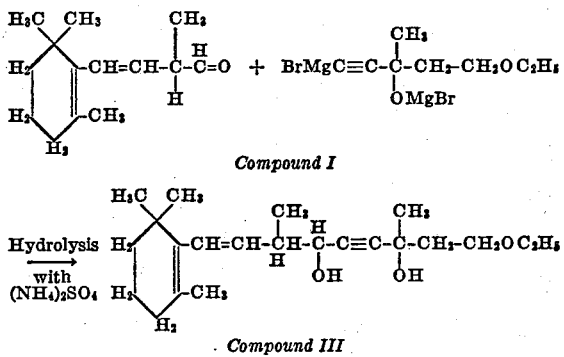

Instead of forming the Grignard of the β-ethoxy ethyl methyl ethynyl carbinol as described above and reacting it with Compound I to produce Compound III, the same result may be obtained by forming the metallo (metal of the first group of the periodic system) compound of the carbinol and reacting it with Compound I. Compound III produced by either of these methods is partially reduced or hydrogenated by dissolving one mole of it in glacial acetic acid, adding about 2 g. of freshly prepared palladium black, and continuously shaking the mixture in a flask while introducing exactly one mole of hydrogen. The hydrogenated product, designated Compound IV, is then dehydrated to the ethyl ether of vitamin A as follows:

Dissolve 0.2 of a mole of Compound IV in about 150 cc. of anhydrous toluene and add to the mixture 30 g. of anhydrous pyridine. Cool the mixture to between 0 and —5° C. and add with rapid stirring 0.42 of a mole of phosphorus tribromide. Allow mixture to warm slowly to room temperature and increase the temperature to about 60–70° C. and keep it there for one to two hours. The mixture will become brown. Cool and add to it 300 cc. of 95% alcohol containing 0.45 of a mole of potassium hydroxide. The mixture will heat up but do not allow the temperature to exceed 70° C. Keep it at this temperature with nitrogen passing through the solution for two to three hours, then remove most of the alcohol in vacuum. Cool and pour into deoxygenated cold water (four volumes) and separate the resulting layers. Extract the aqueous layer once or twice with ether and combine the non-aqueous extracts. Extract the non-aqueous solutions with 5% aqueous solution of tartaric acid. The non-aqueous mixture is then dried, solvents removed under reduced pressure in an atmosphere of nitrogen, and the residue subjected to high vacuum distillation to distill the low boiling fractions at not higher than 60–80° C. (bath temperature).

Another method of dehydrating Compound IV is as follows:

A small amount (usually about one-tenth by weight of the amount of Compound IV to be dehydrated) of anhydrous p-toluene sulfonic acid is added to a solution of Compound IV in benzene, toluene or xylene and the mixture distilled under slightly reduced pressure, the benzene, toluene or xylene carrying water with it into the distillate. The residue is then treated with dilute sodium hydroxide solution to remove the p-toluene sulfonic acid and the product is purified by fractional crystallization at low temperature. The dehydration by this method is represented by the equation

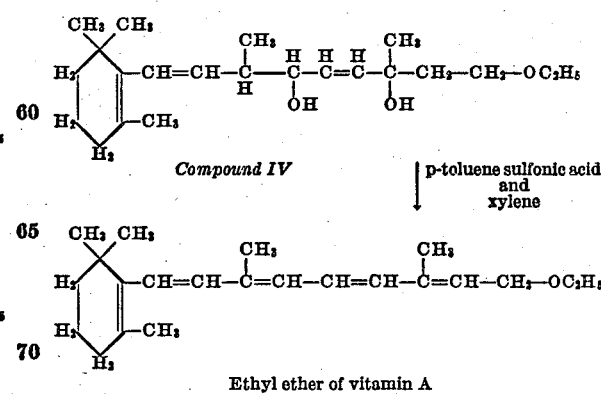

Ethyl ether of vitamin A

The ethyl ether of vitamin A may also be obtained by dehydrating the β-ethoxy ethyl methyl ethynyl carbinol with p-toluene sulfonic acid by the method described above for the dehydration of Compound IV or by passing it through hot AlPO₄, and the resulting dehydrated acetylene compound,

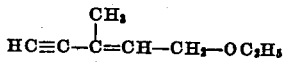

converted into the Grignard compound thereof with ethyl magnesium bromide. The acetylene Grignard, 3-methyl-4-ethoxymethyl vinyl acetylene, may then be allowed to react with Compound I to form Compound V.

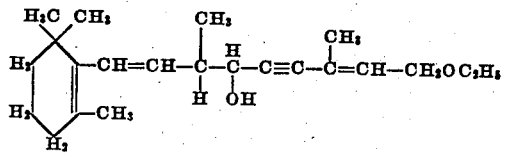

*Compound V*

Compound V may also be made as follows:

Alkali metal, such as lithium, is dissolved in liquid ammonia and an equivalent quantity of the acetylene compound, 3-methyl-4-ethoxymethyl vinyl acetylene, is added. To the resulting mixture, at a temperature between −60° and −70° C., an equivalent amount of Compound I is added with rapid stirring. After stirring for 24 hours, the ammonia is removed and the residue treated with a cold aqueous mixture of ammonium sulfate or chloride. The product is then extracted with ether and purified as in other cases.

Compound V is then partially hydrogenated (acetylene to ethylene bond) with Pd+H₂ and the resulting carbinol is either directly dehydrated with p-toluene sulfonic acid or dehydrobrominated as described above to form the ethyl ether of vitamin A.

Instead of combining Compound I with the Grignard or metallo compound of β-ethoxy ethyl methyl ethynyl carbinol or its dehydration product as described above, one may arrive at the same end result by converting Compound I into the Grignard or metallo compound of the acetylene carbinol thereof and combining it with the β-alkoxy ethyl methyl ketone. The acetylene carbinol of Compound I may be prepared as described in my companion application Serial No. 353,775, filed August 22, 1940, and converted into the Grignard or metallo compound thereof in the customary manner. The synthesis starting with the Grignard or metallo derivative of the acetylene carbinol of Compound I is shown by the following equations:

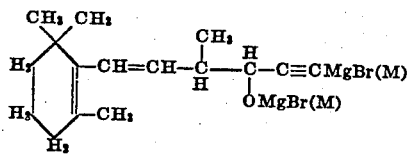

*Compound VI*

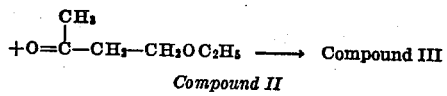

*Compound II*

Compound III is then hydrogenated and dehydrated to the ethyl ether of vitamin A as described above.

A further alternative procedure is to form the Grignard or alkali metal derivative of the dehydrated acetylene carbinol of aldehyde Compound I and combine it with the β-alkoxy ethyl methyl ketone. This alternative method is represented by the equation:

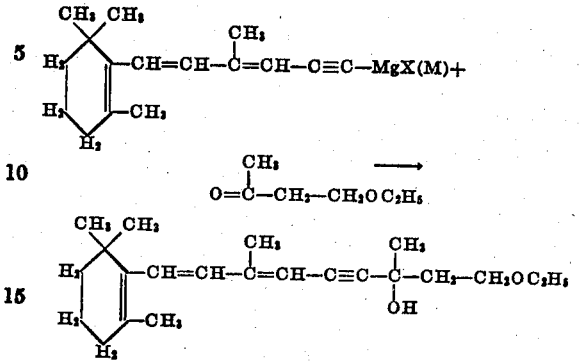

*Compound VII*

In the above formula, X stands for a halogen in a Grignard group and M stands for an alkali metal such as sodium or lithium which may be present in place of the Grignard group.

Compound VII above is an isomer of Compound V. It is partially hydrogenated (acetylene to ethylene bond) and the resulting carbinol dehydrated by the methods used for the hydrogenation and dehydration of Compound V yielding the ethyl ether of vitamin A.

Detailed descriptions of the two alternative methods outlined above are as follows:

(A) To two mole-equivalents of ethyl magnesium bromide in anhydrous ether add slowly with stirring at 0° one mole-equivalent of the acetylene carbinol of aldehyde Compound I. Allow the mixture to warm up to room temperature then reflux it gently for six to eight hours. Cool mixture to 0° and add slowly with stirring one mole-equivalent of β-ethoxy ethyl methyl ketone, then reflux the mixture in an atmosphere of nitrogen for 24 hours. Cool and pour the mixture into a mixture of ammonium sulfate and ice and extract with ether. From the ethereal solution the acetylene glycol (Compound III) is recovered.

Compound III is partially hydrogenated (acetylene to ethylene bond) as before and the resulting product dehydrated.

(B) To one mole-equivalent of ethyl magnesium bromide in anhydrous ether add slowly with stirring at 0° one mole-equivalent of the dehydrated acetylene carbinol of aldehyde Compound I. Allow the mixture to warm up to room temperature and reflux it gently for about 10 hours. Cool to 0° and add one mole-equivalent of β-ethoxy ethyl methyl ketone and reflux the mixture for 24 hours. Cool and pour into a mixture of ammonium sulfate and ice and extract the acetylene carbinol (Compound VII) with ether from which it is recovered and purified.

The carbinol is then partially reduced and the resulting product dehydrated as before.

For the preparation of the trityl ether of vitamin A one may start with the preparation of methyl vinyl ketone by reacting acetone with formaldehyde in the presence of sodium hydroxide. Since this compound is known and available, its complete preparation need not be described. The preparation, without separation and recovery of the methyl vinyl ketone, may, however, be combined with the next step in the complete process, i. e. the preparation of β-hydroxy ethyl methyl ketone as follows:

Three hundred and eighty cc. of acetone is mixed with 100 cc. of formalin (37%), and to the mixture is added 4 cc. of 1N sodium hydroxide. Any multiple of these amounts may be used in any one run; the larger the run, the more efficient the cooling must be during the reaction which follows the addition of the sodium hydroxide. The mixture is then allowed to stand and enough water is run over the surface of the container to keep the temperature of the solution slightly below that of the room. Heat evolution is quite rapid a few minutes after the reaction is started, but this soon subsides. The reaction mixture is then allowed to stand at room temperature for about 4–5 hours. After this, it is neutralized with a slight excess (4.2 cc.) of 1N hydrochloric acid. A little powdered calcium carbonate is then added to react with the acid and the mixture well shaken.

Now add slowly anhydrous magnesium sulfate while cooling under tap water until two distinct layers separate. Remove upper layer and dry it further by shaking with fresh magnesium sulfate. After it has been thoroughly dried, the mixture is filtered and the acetone distilled under reduced pressure. Finally fractionate the residue under very low pressure (2 to 5 mm.) and collect the product that boils to within a few degrees. This may be used for the next preparation.

The reaction to this point may be represented by the equation:

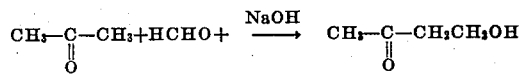

This β-hydroxy ethyl methyl ketone is then converted to β-triphenyl methoxy ethyl methyl ketone as follows:

Dissolve 10 g. (1 mole) of β-hydroxy ethyl methyl ketone in about 20 cc. of anhydrous pyridine and add to the solution 1.2 moles of freshly recrystallized triphenyl chloromethane. Heat the mixture on the water bath for two hours, then cool and pour into water (about 4 volumes). Filter the mixture and wash the solid with cold water. Recrystallize from acetone, alcohol or ether.

The β-triphenyl methoxy ethyl methyl ketone is then converted to β-triphenyl methoxy ethyl methyl ethynyl carbinol as follows:

To 200 cc. of anhydrous t-butyl alcohol (distilled over a small amount of sodium) in a one liter, 3-necked flask equipped with a Hershberg stirrer, a dropping funnel and a bent side tube, add ten grams of metallic potassium. After all of the potassium had dissolved, pass through the solution while stirring dry acetylene for one-half hour. Add slowly, in the course of one hour, while acetylene is being passed through the solution, 80 g. of β-triphenyl methoxy ethyl methyl ketone dissolved in about 200 cc. of anhydrous ether. Continue stirring and passing acetylene for six hours longer. Pour product onto a mixture of ice and tartaric acid and extract with ether. Dry the ether solution with anhydrous magnesium sulfate and purify the product by recrystallization.

The β-triphenyl methoxy ethyl methyl ethynyl carbinol is then converted to the Grignard thereof as follows:

Prepare a Grignard solution in a large 3-necked dropping funnel using freshly purified ethyl bromide (31 g.) and magnesium turnings (6.75 g.) in 200 cc. of anhydrous ether and after all of the magnesium has gone into solution allow the Grignard solution to drop into an ethereal (anhydrous) solution of 50 g. of β-triphenyl methoxy ethyl methyl ethynyl carbinol. Reflux the mixture for 2 to 3 hours. The solution is now ready for the next step.

The Grignard of the β-triphenyl methoxy ethyl methyl ethynyl carbinol is then reacted with the aldehyde, Compound I, as follows:

To the acetylene Grignard from the previous step, add 29 g. of the aldehyde Compound I in 100 cc. of anhydrous ether, keeping the mixture at 0° C. during the addition. Allow the mixture to warm slowly to room temperature then reflux for 8 to 10 hours. Cool and pour mixture onto ice mixed with sufficient amount of d-tartaric acid. Extract with ether, dry over anhydrous magnesium sulfate and remove the ether. Distill all low-boiling fractions under high vacuum at not higher than 60–80° C.

The reaction is shown by the equation:

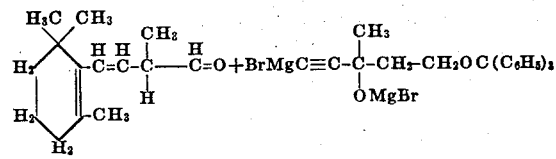

*Compound I*

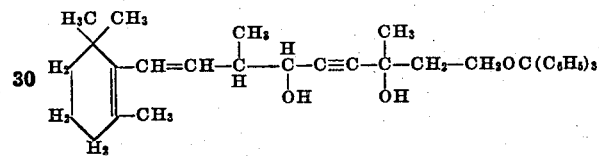

*Compound VIII*

Compound VIII produced as described above is then hydrogenated with exactly 1 mole of hydrogen, using palladium deposited on calcium carbonate as the catalyst and the product is converted to the trityl ether of vitamin A as follows:

Dissolve 5 g. of hydrogenated Compound VIII in about 150 cc. of pure toluene and add to the mixture 40 g. of anhydrous pyridine. Cool the mixture between 0° and −5° C. and add with rapid stirring 24 g. phosphorus tribromide. Allow the mixture to warm slowly to room temperature and increase the temperature to about 60–70° C. and keep it there for one to two hours. The mixture will become brown. Cool and add to it 300 cc. of 95% alcohol containing 30 g. potassium hydroxide. The mixture will heat up but do not allow the temperature to exceed 70° C. Keep it at this temperature with nitrogen passing through the solution for two to three hours. Cool and pour into deoxygenated cold water (four volumes) and separate the resulting layers. Extract the aqueous layer once or twice with ether and combine the non-aqueous solutions. Extract the non-aqueous solutions a number of times with 5% aqueous solution of tartaric acid. The non-aqueous mixture is then dried over anhydrous magnesium sulfate, filtered and the solvents removed under reduced pressure in an atmosphere of nitrogen. The product is recrystallized from petroleum ether or some other suitable solvent. Handling of this product should be done in an inert atmosphere.

In the foregoing description of the preparation of the trityl ether of vitamin A only a single procedure is described, but it will be understood that the alternatives which have been described in connection with the preparation of the ethyl ether are applicable in the preparation of the trityl ether as well as the other alkyl ethers.

I claim:
1. A compound of the general formula

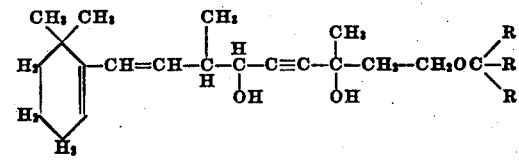

in which each R stands for a member of the group consisting of hydrogen and hydrocarbon groups.

2. A compound of the general formula

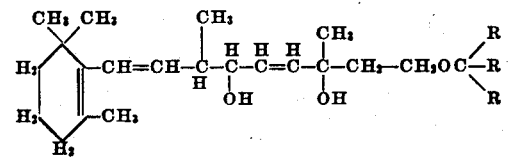

in which each R stands for a member of the group consisting of hydrogen and hydrocarbon groups.

3. A compound of the formula

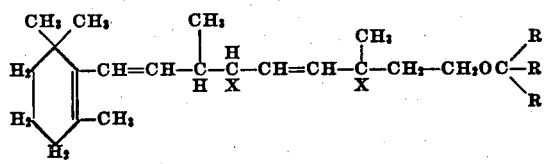

in which X stands for halogen and R for a member of the group consisting of hydrogen and hydrocarbon groups.

4. Process for the synthesis of ethers of vitamin A which consists in reacting a compound of the formula

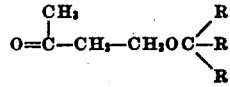

in which R stands for a member of the group consisting of hydrogen and hydrocarbon groups with a compound of the formula

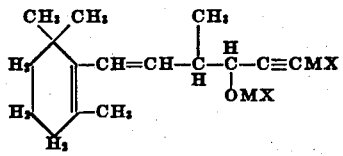

in which M stands for a metal of the Grignard type and X stands for a halogen to produce a compound of the formula

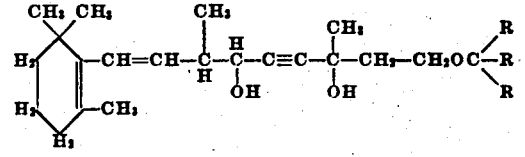

in which R stands for a member of the group consisting of hydrogen and hydrocarbon groups, adding one mole of hydrogen to the last mentioned compound to produce a compound of the formula

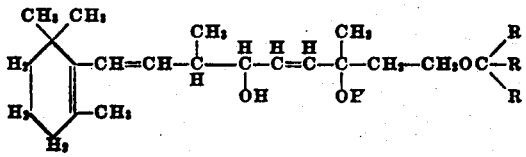

in which R stands for a member of the group consisting of hydrogen and hydrocarbon groups, halogenating the last mentioned compound to produce a compound of the formula

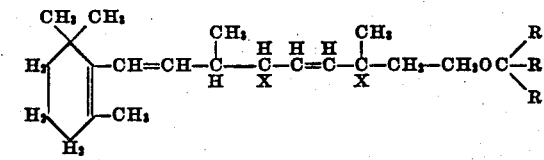

in which X stands for halogen and R stands for a member of the group consisting of hydrogen and hydrocarbon groups and dehydrohalogenating the last mentioned compound.

5. In a process for the synthesis of ethers of vitamin A the step which consists in reacting a compound of the formula

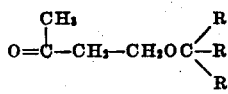

in which R stands for a member of the group consisting of hydrogen and hydrocarbon groups, with a compound of the formula

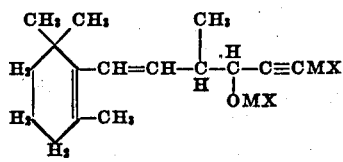

in which M stands for a metal of the Grignard type and X stands for a halogen.

6. In the synthesis of ethers of vitamin A the step which consists in adding one mole of hydrogen to a compound of the formula

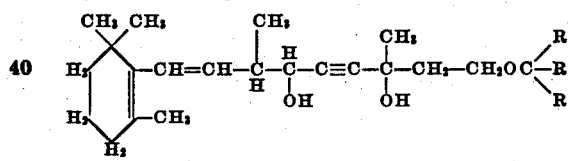

in which R stands for a member of the group consisting of hydrogen and hydrocarbon groups.

7. In a process for the synthesis of ethers of vitamin A the step which consists in halogenating a compound of the formula

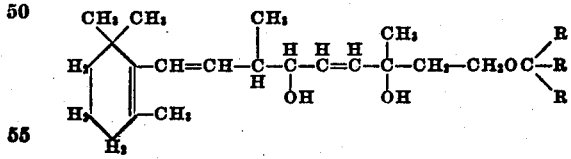

in which R stands for a member of the group consisting of hydrogen and hydrocarbon groups.

8. In a process for the synthesis of ethers of vitamin A the step which consists in dehydrohalogenating a compound of the formula

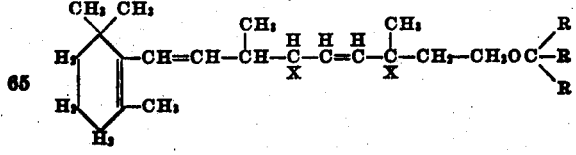

in which X stands for halogen and R stands for a member of the group consisting of hydrogen and hydrocarbon groups.

NICHOLAS A. MILAS.